United States Patent
Zhao (10) Patent No.: US 9,192,023 B2
(45) Date of Patent: Nov. 17, 2015

(54) DEVICE AND METHOD FOR ADJUSTING ELECTRICITY CONSUMPTION OF A PLURALITY OF LIGHTING DEVICES OF A LIGHTING SYSTEM

(75) Inventor: Meng Zhao, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 229 days.

(21) Appl. No.: 14/007,988

(22) PCT Filed: Mar. 28, 2012

(86) PCT No.: PCT/IB2012/051472
§ 371 (c)(1),
(2), (4) Date: Sep. 27, 2013

(87) PCT Pub. No.: WO2012/137104
PCT Pub. Date: Oct. 11, 2012

(65) Prior Publication Data
US 2014/0015445 A1    Jan. 16, 2014

(30) Foreign Application Priority Data
Apr. 4, 2011    (EP) .................... 11161039

(51) Int. Cl.
*H05B 37/02* (2006.01)
*H02J 3/14* (2006.01)
*G06Q 10/06* (2012.01)
*G06Q 50/06* (2012.01)

(52) U.S. Cl.
CPC ............ *H05B 37/02* (2013.01); *G06Q 10/0631* (2013.01); *G06Q 50/06* (2013.01); *H02J 3/14* (2013.01); *H05B 37/0245* (2013.01); *H02J 2003/146* (2013.01); *Y02B 70/3225* (2013.01); *Y02B 70/3283* (2013.01); *Y04S 20/221* (2013.01); *Y04S 20/222* (2013.01); *Y04S 20/224* (2013.01); *Y04S 20/246* (2013.01)

(58) Field of Classification Search
CPC .... H05B 37/02; H05B 37/0245; G06Q 50/06; G06Q 10/0631; H02J 3/14; Y04S 20/224; Y04S 70/3283; Y04S 70/3225; Y04S 20/246; Y04S 20/222; Y04S 2003/146; Y04S 20/221
See application file for complete search history.

(56) References Cited

U.S. PATENT DOCUMENTS

| 7,747,357 B2 | 6/2010 | Murdoch |
| 7,747,537 B2 | 6/2010 | Grim, III et al. |
| 2007/0135973 A1 | 6/2007 | Petite |

(Continued)

OTHER PUBLICATIONS

Maarten Hommelberg et al; "Deliverable", EU Project No. 238868, SEESGEN-ICT, May 1, 2010.

(Continued)

*Primary Examiner* — Jung Kim
(74) *Attorney, Agent, or Firm* — Meenakshy Chakravorty (57) ABSTRACT

The invention is based on the idea that control of power consumption in a system comprising power consuming devices like lighting devices, for example, can be performed by dividing the power consuming devices of the system into a plurality of groups and by taking into account power consumption or load shedding or restoration capability for each group. Further, the invention implements an auction mechanism for adjusting power consumption or load in the lighting system such that an effective, fast, user requirements considering and lighting device functions and characteristics considering adjusting is achieved.

13 Claims, 6 Drawing Sheets

(56) References Cited

U.S. PATENT DOCUMENTS

2010/0217450 A1    8/2010   Beal et al.
2012/0022711 A1*   1/2012   Sakaguchi et al. ............ 700/295
2014/0256378 A1*   9/2014   Park et al. .................. 455/552.1
2014/0359315 A1*   12/2014   Matsui .......................... 713/300

OTHER PUBLICATIONS

D.J. Leeds: "The Smart Grid in 2010: Market Segments Applications and Industrial Players", Greentech Media Inc, 2009, pp. 1-5.

* cited by examiner

DEVICE AND METHOD FOR ADJUSTING ELECTRICITY CONSUMPTION OF A PLURALITY OF LIGHTING DEVICES OF A LIGHTING SYSTEM

FIELD OF THE INVENTION

The invention relates to a device configured for adjusting electricity consumption of a plurality of lighting devices of a lighting system, a method for adjusting electricity consumption of a plurality of lighting devices of a lighting system and a (lighting) system comprising the device.

BACKGROUND OF THE INVENTION

To cope with the daily increase of electricity demands, smart grids are developed and implemented all over the world. In general, smart grids are a form of electricity networks, which utilize communications technologies (e.g. digital, wired and/or wireless etc.) and deliver electricity from suppliers to consumers or users by use of two-way communications to control the delivery and consumption of electricity. Compared to traditional grids, besides the delivery of electricity from suppliers to consumers or users, the smart grids also transmit information by use of the two-way communications for cost reduction, for balancing the electricity production and/or delivery with electricity consumption and/or for increasing reliability and transparency of electricity production, delivery and consumption. Advanced Metering Infrastructure (AMI) refers to systems, which measure, collect and analyze electricity usage, and interact with advanced devices, such as electricity meters etc., through various communications media, devices, systems etc. either on request (on-demand) or on pre-defined schedules. AMI is utilized also as an information gateway from utility to end users.

With the development of smart grids, also developments of new applications have become important. The applications are often incorporated in an information network, which is placed on the top of the traditional electricity grid and enables awareness for both the electricity producer and/or deliverer side and the electricity consumer side. An example of such an application incorporated in an information network is demand response (DR), by which consumption of electricity is managed in response to supply conditions, for example, when available, generated electricity amount is smaller than the consumed electricity amount and vice versa when higher electricity consumption is permitted, or when electricity consumption reduction or increase is reasonable in response to electricity market prices. With the demand response mechanism, Utilities may initiate electricity consumption reduction or increase by electricity consumers for balancing the provided/generated electricity amount and the consumed electricity amount. To this, when demand response mechanism is used, a corresponding request for changing the electricity consumption is transmitted from the utilities to electricity consumers or to electricity consuming systems or devices, respectively. In general, the demand response mechanism is well known and will, therefore, not be explained in more detail. For more information concerning smart grids and applications it is referred exemplary to "The Smart Grid in 2010: Market Segments Applications and Industrial Players", LEEDS, D. J. (2009), GREENTECH MEDIA INC.

An example of communicating between a utility side and an electricity consuming side is provided in U.S. Pat. No. 7,747,537 B2, where the electricity consuming side is able to shed one or more loads in response to a load shed command from the utility side. Modern networked lighting system as an electricity load can vary their electricity consumption via dimming the lighting devices in the system. This gives the possibility to use the demand response mechanism for controlling electricity consumption or power consumption, respectively, in a lighting system.

In a lighting system, (some) lighting devices and/or lighting device groups can be dimmed towards a certain level to reduce their load. This may depend on functions and/or on characteristics of the lighting devices and/or lighting device groups. Therefore, load shedding capabilities of each lighting device and/or lighting device group are different.

The known control mechanisms for controlling the electricity consumption or power consumption, respectively, still fail to distribute the electricity or power consumption or load in the entire lighting system such: that an optimal illuminating is achieved by the lighting devices in the lighting system by considering the functions and/or on characteristics of the lighting devices and/or lighting device groups; that end user comfort is not sacrificed at the lowest level; that the impact of the dimming is not minimized to the function of the system.

SUMMARY OF THE INVENTION

It is an object of the present invention to provide a methodology for an efficient and effective control of power consumption in systems with power consuming devices.

The object is achieved by the features of the independent claims.

The invention is based on the idea that control of power consumption in a system comprising power consuming devices like lighting devices, for example, can be performed by dividing the power consuming devices of the system into a plurality of groups and by taking into account power consumption or load shedding or restoration capability for each group. Further, the invention implements an auction mechanism for adjusting power consumption or load in the lighting system such that an effective, accurate, fast, user requirements considering and lighting device functions and characteristics considering adjusting is achieved.

In one aspect of the present invention, device is provided, which is configured for adjusting power consumption of a plurality of lighting devices of a lighting system, said plurality of lighting devices being divided into a plurality of groups and each group comprising at least one lighting device of the plurality of lighting devices and having a corresponding power consumption change value, wherein the corresponding power consumption change value indicates a maximum value, by which the power consumption may be changed in said group, wherein the device is adapted to:
  determine a first group, which has a power consumption change value, which is a largest power consumption change value among the power consumption change values of the plurality of groups;
  determine a second group, which has a power consumption change value being a second largest power consumption change value among the power consumption change values of the plurality of groups; and
  adjust power consumption of the first group by use of the power consumption change value of the second group with regard to a target power consumption change value of the lighting system, by which the power consumption is intended to be changed in the lighting system.

In this way, the power consumption and, thus, the dimming of lighting devices (since a lower power consumption of a lighting device indicates decrease of luminance of the lighting device and vice versa—higher power consumption of a lighting device indicates increase of luminance of the lighting device) is performed such that function and/or characteristics of the lighting devices are taken into consideration. This may achieved, particularly, by dividing the lighting devices into groups such that, for said dividing, functions and/or characteristics of the lighting devices are taken into consideration or are (one of) criteria. Further, this may achieved by taking into consideration for each group the corresponding power consumption change value, which indicates a (actual, current) maximum value by which the power consumption may be (actually, currently) changed in said group. Thus, for each group, individual factors of lighting devices of the group are taken into consideration for adjusting power consumption and, thus, dimming the lighting devices. Moreover, an optimal adjusting the load/power control/dimming levels in the entire lighting system is enabled. It is ensured, that the end user comfort is not sacrificed or affected by adjusting the load/power control/dimming levels in the entire lighting system. Furthermore, several levels of sensitivity of adjusting may be ensured when dividing the lighting devices into groups and executing the present invention, wherein a rough dividing of groups (being, for example, less sensitive with regard to functions and/or characteristics of the lighting devices) may lead to a more rough adjusting results and a more fine dividing of groups (being for example more sensitive with regard to functions and/or characteristics of the lighting devices) may lead to a more sensitive adjusting results, which are sensitive, particularly, with regard to needs and requirements of the end users and/or capabilities of and requirements to the lighting devices. Thus, by the present invention, a flexible, efficient and fast adjusting is enabled.

According to an embodiment of the present invention, the device is configured to adjust power consumption of the first group by the target power consumption change value of the lighting system if the power consumption change value of the second group is larger than the target power consumption change value of the lighting system; and to adjust power consumption of the first group by the power consumption change value of the second group if the power consumption change value of the second group is smaller than or equal the target power consumption change value of the lighting system. In this way, achievement of advantages and effects of the present invention is supported.

According to an embodiment of the present invention, the device is configured to adjust power consumption of the first group by transmitting the target power consumption change value of the lighting system to the first group if the power consumption change value of the second group is larger than the target power consumption change value of the lighting system; and to adjust power consumption of the first group by transmitting the power consumption change value of the second group to the first group if the power consumption change value of the second group is smaller than or equal the target power consumption change value of the lighting system. To this, the device may be configured to transmit the corresponding value to a group controller of the first group, said group controller being configured to control the first group and, particularly, the power consumption of the first group. In this way, achievement of advantages and effects of the present invention is supported.

According to an embodiment of the present invention, if the target power consumption change value of the lighting system indicates that the power consumption is intended to be reduced in the lighting system, the device is configured to reduce power consumption when adjusting power consumption and each power consumption change value of the power consumption values of the plurality of groups indicates a maximum value, by which the power consumption may be reduced in the corresponding group of the plurality of groups, and wherein, if the target power consumption change value of the lighting system indicates that the power consumption is intended to be increased in the lighting system, the device is configured to increase power consumption when adjusting power consumption and each power consumption change value of the power consumption values of the plurality of groups indicates a maximum value, by which the power consumption may be increased in the corresponding group of the plurality of groups. In this way, achievement of advantages and effects of the present invention is supported.

According to an embodiment of the present invention, the device is adapted to transmit a power consumption change request to each group of the plurality of groups, wherein said request comprises the target power consumption change value of the lighting system. To this, the device may be configured to transmit the power consumption change request to group controllers of the plurality of group, each group controller being configured to control a corresponding group of the plurality of groups. In this way, achievement of advantages and effects of the present invention is supported.

According to an embodiment of the present invention, the device is adapted to receive for each group of the plurality of groups the corresponding power consumption change value of the group. To this, the device may be configured to receive the power consumption change values of the groups from group controllers of the groups, each group controller being configured to control a corresponding group of the plurality of groups. In this way, achievement of advantages and effects of the present invention is supported.

According to an embodiment of the present invention, the device is adapted to receive the power consumption change values of the plurality of groups in response to the power consumption change request. In this way, achievement of advantages and effects of the present invention is supported.

According to an embodiment of the present invention, the device is adapted to execute sorting of the power consumption change values of the plurality of groups, wherein a larger power consumption change value is sorted before a smaller power consumption change value. In this way, achievement of advantages and effects of the present invention is supported.

According to an embodiment of the present invention, if the power consumption change value of the second group is smaller than the target power consumption change value of the lighting system, the device is configured to:
  reset the target power consumption change value of the lighting system by subtracting the power consumption change value of the second group from the target power consumption change value of the lighting system;
  reset the power consumption change value of the first group by subtracting the power consumption change value of the second group from the power consumption value of the first group; and
  execute anew the adjusting power consumption of a plurality of lighting devices of a lighting system as outlined above and described in more detail in below. In this way, achievement of advantages and effects of the present invention is supported.

According to an embodiment of the present invention, the device is configured to adjust power consumption of the plurality of lighting devices of the lighting system after receiving the target power consumption change value of the lighting system by the device. In this way, achievement of advantages and effects of the present invention is supported.

In one aspect of the present invention, a method for adjusting power consumption of a plurality of lighting devices of a lighting system is provided, said plurality of lighting devices being divided into a plurality of groups and each group comprising at least one lighting device of the plurality of lighting devices and having a corresponding power consumption change value, wherein the corresponding power consumption change value indicates a maximum value, by which the power consumption may be changed in said group, wherein the method comprises:

determining a first group, which has a power consumption change value, which is a largest power consumption change value among the power consumption change values of the plurality of groups;

determining a second group, which has a power consumption change value being a second largest power consumption change value among the power consumption change values of the plurality of groups; and adjusting power consumption of the first group by use of the power consumption change value of the second group with regard to a target power consumption change value of the lighting system, by which the power consumption is intended to be changed in the lighting system. Particularly, said method comprises steps performed by the device, configured for adjusting the power consumption of the plurality of lighting devices of the lighting system as outlined above and described in more detail below. Thus, with the method the same advantages and effects of the present invention are achieved as with the above-outlined and below in more detail described device.

In a further aspect of the present invention, a system is provided, which comprises a device configured for adjusting the power consumption of the plurality of lighting devices of the lighting system as outlined above and described in more detail below.

In this way, the power consumption and, thus, the dimming of lighting devices are performed such that function and/or characteristics of the lighting devices are taken into consideration. Further, an optimal adjusting the load/power control/dimming levels in the entire lighting system is enabled, wherein it is ensured, that the end user comfort is not sacrificed or affected by adjusting the load/power control/dimming levels in the entire lighting system. Furthermore, the present invention ensures a flexible, efficient and fast adjusting of electricity consumption or power consumption, respectively.

DETAILED DESCRIPTION OF THE EMBODIMENTS

Figure 1:
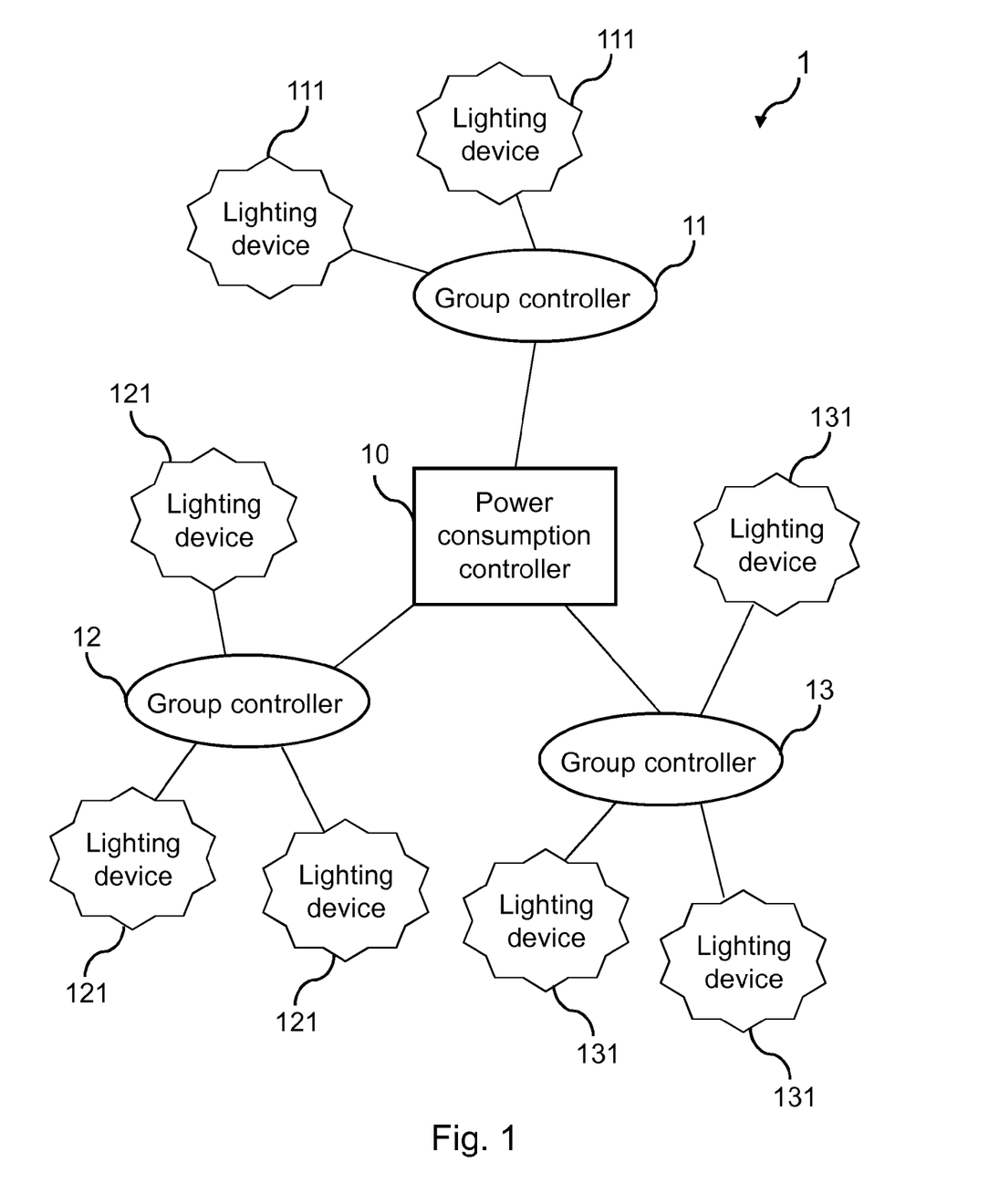
FIG. 1 illustrates an arrangement of a lighting system according to an embodiment of the present invention.

FIG. 1 illustrates an arrangement of a lighting system 1 according to an embodiment of the present invention. The system 1 comprises a plurality of lighting devices 111, 121, 131 divided into groups, wherein, according to the present embodiment, for each group a group controller 11, 12, 13 is provided. The group controller 11, 12, 13 is configured to control the operation of groups, particularly, to control the load, power consumption or electricity consumption, respectively, in the corresponding group of devices 111, 121, 131. Each of the groups comprises at least one lighting device 111, 121, 131. In line with the present embodiment, the power consumption or load in the lighting system 1 is controlled by a power consumption controller 10. To this, the power consumption controller 10 is connected with the groups of lighting devices 111, 121, 131 for communicating with the groups of lighting devices 111, 121, 131. According to the present embodiment, the communication is realized via the respective group controllers 11, 12, 13, wherein according to the present invention also further appropriate implementations and/or arrangements for communicating between the power consumption controller 10 and the groups of devices 111, 121, 131 are possible. Thus, according to the present embodiment, communications connections are established between the power consumption controller 10 and the group controllers 11, 12, 13 and between the group controllers 11, 12, 13 and the lighting devices 111, 121, 131 of the corresponding groups for communicating data between the power consumption controller 10 and the groups of devices 111, 121, 131. The division of the lighting devices 111, 121, 131 into groups may be performed by considering several different factors like the functions, characteristics, and/or dimming capabilities of the lighting devices 111, 121, 131, requirements of users and/or characteristics of environments of the lighting devices 111, 121, 131 etc., for example. Further, each group comprises at least one lighting device 111, 121, 131. Thus, a group may comprise also one lighting device 111, 121, 131 only, what ensures an individual power consumption adjusting by considering the functionalities and characteristics of the lighting devices 111, 121, 131.

Figure 2:
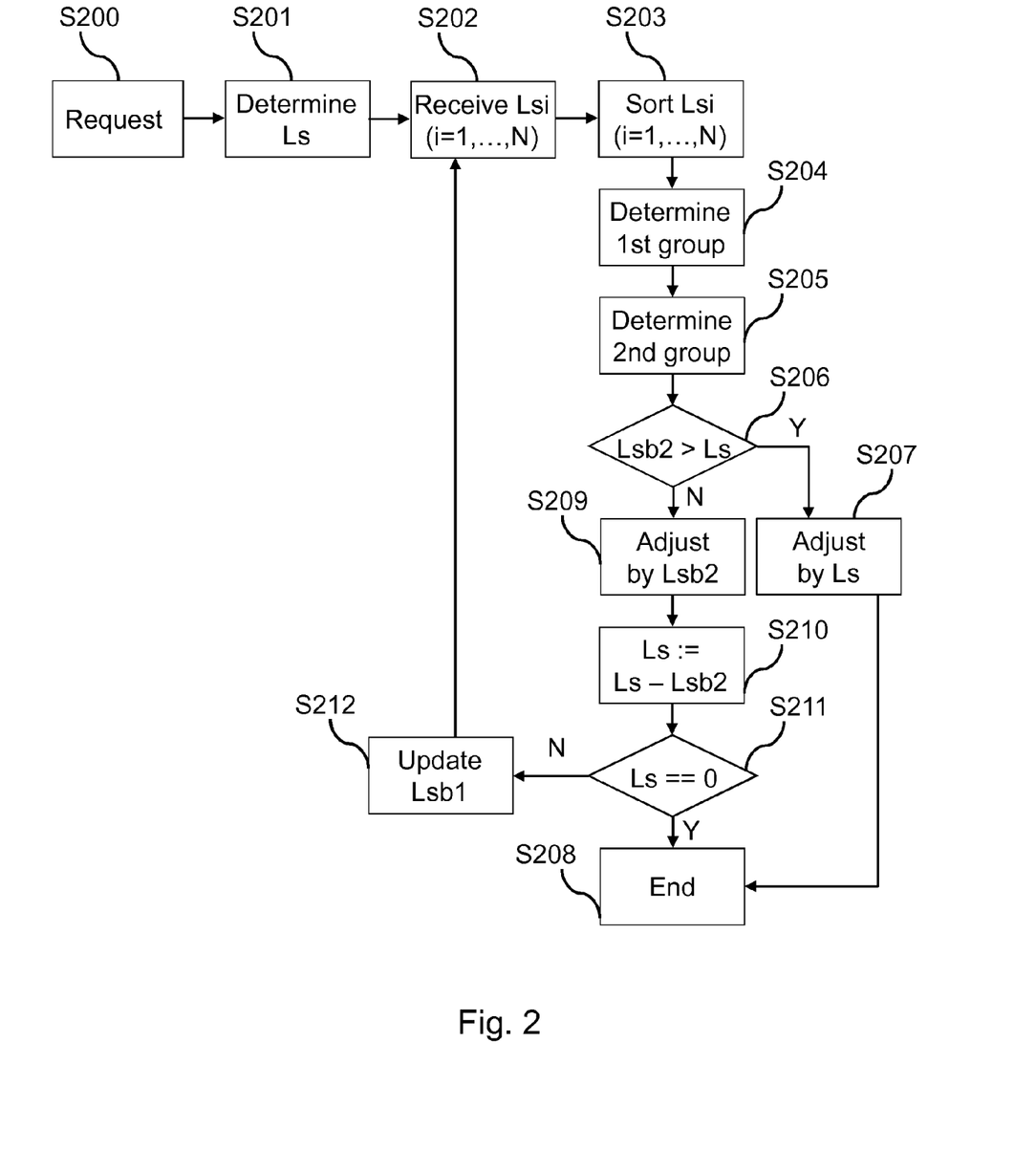
FIG. 2 illustrates steps or actions for adjusting power consumption of a plurality of lighting devices of the lighting system according to an embodiment of the present invention, wherein the power consumption is reduced or shed.

FIG. 2 illustrates steps or actions for reducing or shedding power consumption of a plurality of lighting devices 111, 121, 131 of the lighting system 1 according to an embodiment of the present invention.

In line with the present embodiment, an auction/bidding based load or power consumption shedding strategy is implemented, where the auction uses the 2nd bid principle to determine the winner of the auction. According to the present embodiment, the power consumption controller 10 is configured to reduce or shed the power consumption or load in the lighting system 1 with regard to a (given) amount of power or load to be reduced in the lighting system 1. In following, this target power consumption reduction value or target load reduction value, respectively, is referred to as Ls. The target value Ls may be received by the power consumption controller 10 from a utility or from a facility manager, for example, or may be calculated by the power consumption controller 10 based, for example, on the price of the electricity usage comparing to a target cost or load limit and/or on the ratio or relationship between the available/generated amount of electricity and the consumed electricity. Here, several appropriate ways of deriving the target value Ls are possible according to the present invention. Further, with Li (i=1,2, ..., N, wherein N is the number of groups), current load or power consumption, respectively, of each lighting device group is designated. Since a lighting device group may comprise also one lighting device 111, 121, 131, the approach presented according to the present embodiment may be applied also with regard to (at least one of the) lighting devices 111, 121, 131 individually. The minimum power consumption, that each corresponding lighting device group can go or by which each corresponding group can be operated at least, is designated as Lmni (i=1,2, ..., N). Lmni may correspond to the minimum dimming level of the lighting devices 111, 121, 131 of the group i determined, for example, by regulation or user setting. With Lsi=Li −Lmni (i=1,2, ..., N) the load shedding capability of each lighting device group is denoted.

Here, it has to be noted that Lsi of the present embodiment corresponds to the above-mentioned more general power consumption change value and that the target value Ls of the present embodiment corresponds to the above-mentioned more general target power consumption change value. According to the present embodiment, Lsi denotes the maximum value by which the power consumption in the i-th group can be reduced or shed, respectively.

According to the present embodiment, when power consumption or load shedding starts, an energy management system (EMS) or an advanced meter, for example, may start the power consumption or load adjusting process. To this, the EMS or meter may transmit S200 or broadcast S200 a load or power consumption shedding request (corresponding to the above mentioned general power consumption change request) with the amount Ls or with information enabling determining the amount Ls (e.g., price of the electricity usage comparing to a target cost or load limit and/or information specifying ratio or relationship between the available/generated amount of electricity and the consumed electricity). According to the present embodiment, in step S201, the power consumption controller 10 determines the Ls. This may be performed by use of information provided with the request transmitted in step S200.

Then, according to the present embodiment, in step S202 each lighting device group can start bidding for the target amount Ls. To this, each i-th group or each i-th group controller 11, 12, 13 (i=1, ..., N, wherein N is the number of groups) transmits Lsi as the maximum value, by which the power consumption or load may be reduced in said group, to the power consumption controller 10.

In step S203, the power consumption controller 10, having received the Lsi values for the lighting device groups, may rank or sort the Lsi values in descending order such that as a first value a highest Lsi value is provided and as a last value a lowest Lsi value is provided.

In step S204, a first or winner group is determined by the power consumption controller 10, wherein the winner group is a lighting device group with the highest Lsi, which is referred to as Lsb1 in following. In step S205, a second group is determined by the power consumption controller 10, wherein the second group is a group, which has the second highest Lsi, which is referred to as Lsb2 in following. Subsequently, the power consumption controller can adjust the power consumption or load by use of the Lsb1, Lsb2 and Ls. According to the present embodiment, in step S206, the power consumption controller 10 compares the target value Ls and the power consumption change value (or bidding) of the second group Lsb2. This may be performed by use of the min function, i.e. MIN(Lsb2, Ls). Then, the power consumption controller 10 reduces (adjusts) power consumption or load of the first or winner group by MIN(Lsb2, Ls). To this, if the target value Ls is smaller the power consumption change value (or bidding) of the second group Lsb2, according to the present embodiment, in step S207, the power consumption controller 10 adjusts, i.e., reduces the power consumption of the first group by Ls. To this, the power consumption controller 10 may transmit a message, requesting power consumption or load reduction by Ls, to the first group or to the controller 11, 12, 13 of the first group. The lighting devices 111, 121, 131 of the first group will dim, reduce the luminance such that power consumption of the first group is reduced by Ls. Then, in step S208 the power consumption adjusting is finished according to the present embodiment.

Otherwise, if Ls is not smaller than Lsb2, according to the present embodiment, in step S209, the power consumption controller 10 adjusts, i.e., reduces the power consumption of the first group by Lsb2. To this, the power consumption controller 10 may transmit a message, requesting power consumption or load reduction by Lsb2, to the first group or to the controller 11, 12, 13 of the first group. The lighting devices 111, 121, 131 of the first group will dim, reduce the luminance such that power consumption of the first group is reduced by Lsb2. Thereupon, according to the present embodiment, in step S210 the target value Ls is updated by the power consumption controller 10 by setting Ls to Ls−Lsb2 or to Ls−MIN(Lsb2, Ls) respectively. Then, after updating Ls, in step S211, it is checked according to the present embodiment by the power consumption controller 10, whether further power consumption adjusting or reducing is required. To this, it is checked whether the updated target value Ls is equal to zero. If so, the power consumption adjusting is finished according to the present embodiment. If not, the power consumption change value (i.e. bidding value) Lsb1 of the first group is updated in step S212 by the power consumption controller 10 due to the adjusting the power consumption in the first group in step S209. To this, Lsb1 is set to Lsb1−Lsb2 or to Lsb1−MIN(Lsb2, Ls) respectively. Subsequently, since the power consumption adapting by the target value Ls is still not achieved, the power consumption adjusting is continued by starting the power consumption anew with the (updated) target value Ls.

According to the present embodiment, the power consumption adjusting is started anew with the step S202, thus, with anew receiving of values Lsi from each i-th group.

According to an embodiment, in an implementation of the present invention, the auction-bidding process can be performed in or by the controller 10 to avoid excessive messages to be sent forth and back. The controller 10 first receives initial load shedding request amount Ls and load shedding capability Lsi from each i-th group controller 11, 12, 13 (i=1,2,..., N). Then, in or by the controller 10, iterations can be performed and load shedding amount or power consumption change value, respectively, can be calculated for each group. In the end, the final (determined) load shedding amount for each group or the final (determined) power consumption change value for each group, respectively, will be communicated to the corresponding group controller 11, 12, 13 for execution of the power consumption shedding or reduction, respectively, in the corresponding group. A pseudo-code description of the power redistribution process as implemented in the controller 10 is provided below. The amount of power to be reduced by a k-th group (k∈[1,N]) is equal to the value of δ(k) after the execution of the pseudo-code as provided below.

```
for k:=1 to N do δ(k):=0;
while Ls > 0 do
begin determine k such that Lsk = max { Lsi | 1 ≤ i ≤ N };
    determine m such that Lsm = max { Lsi | 1 ≤ i ≤ N, i≠ k};
    δ:= min (Lsm, Ls);
    δ(k):= δ(k) + δ; Ls:=Ls–δ; Lsk:= Lsk – δ;
end;
```

As can be derived from the pseudo code, index k relates to the first group and Lsk relates to the load shedding capability of the first group with the index k, index m relates to the second group and Lsm relates to the load shedding capability of the second group with the index m. Thus, "determine k" specifies determining S204 the first group and "determine m" specifies determining S205 the second group. With δ(k):=δ(k)+δ, it is expressed that the power consumption of the first or k-th group is reduced S207, S209 by δ(k).

Figure 3:
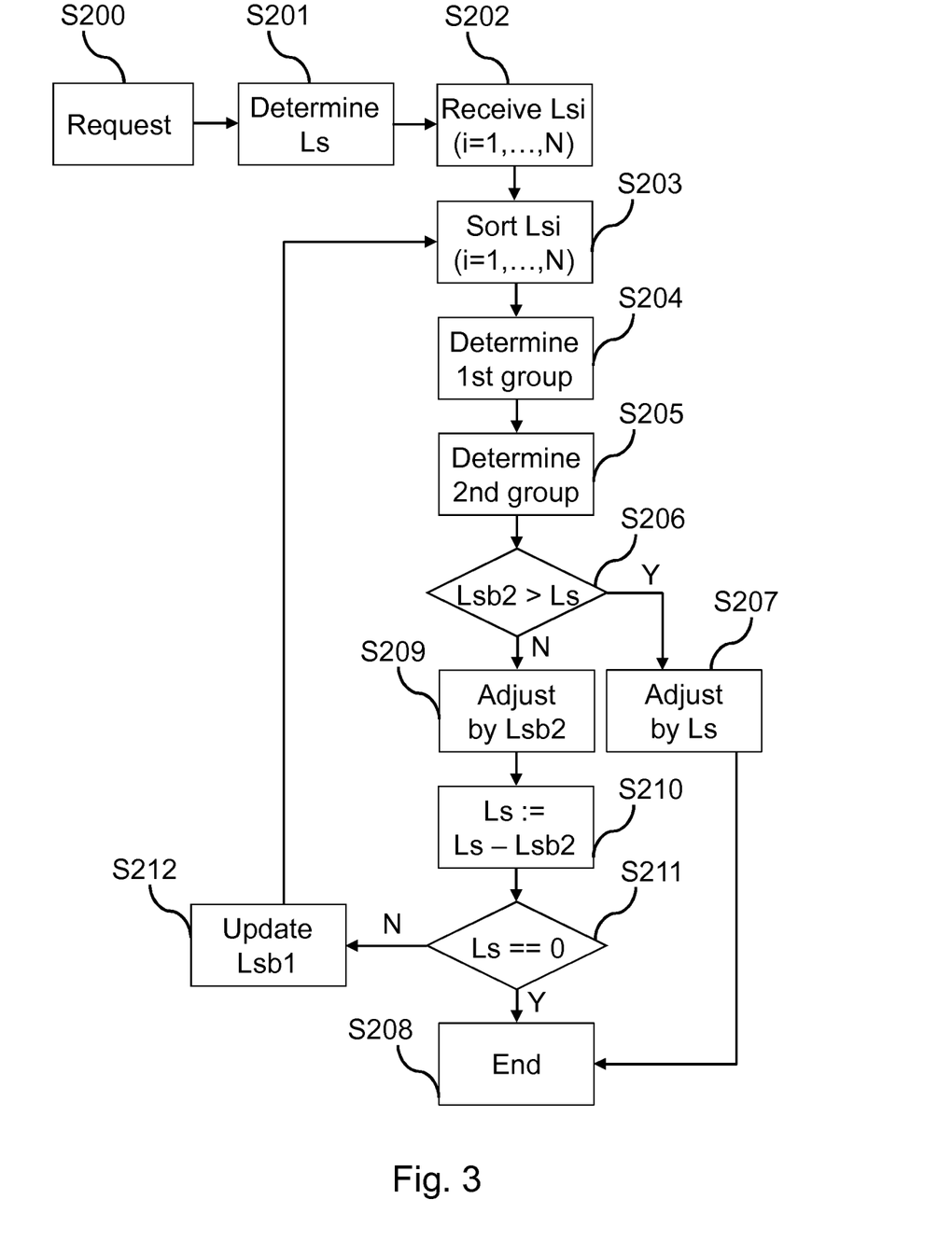
FIG. 3 illustrates steps or actions for adjusting power consumption of a plurality of lighting devices of the lighting system according to an embodiment of the present invention, wherein the power consumption is reduced or shed.

FIG. 3 illustrates steps or actions for adjusting power consumption of a plurality of lighting devices 111, 121, 131 of the lighting system 1 according to an embodiment of the present invention, wherein the power consumption is reduced or shed. In general, the steps of FIG. 3 correspond to steps of FIG. 2. However, according to the present embodiment, the power consumption adjusting is started anew with the step S203. I.e., in line with the present embodiment, no new bidding S202 is performed, the adjusting is performed on the present values Lsi. Here, it has to be noted that, if no ranking or sorting S203 of values Lsi is performed, the anew adjusting power consumption may be started also with step S204, i.e. with determining of the first group having the highest Lsi. Here, the present invention allows also an implementation where several starting points (like S202, S203, S204) for anew executing the adjusting power consumption may be combined, wherein a corresponding appropriate starting point may be chosen by use of additional factors like the probability for change of values Lsi, for example.

With the load shedding strategy of the present invention as explained exemplary above, when load changes after the shedding is finished, e.g., a person enters the room and activates the lighting devices 111, 121, 131, the lighting devices 111, 121, 131 that request extra electricity could start an auction for load shedding from other lighting device groups. When the auction ends, the lighting devices 111, 121, 131 in the room will light up. This may avoid adjusting dimming levels of all lighting devices 111, 121, 131 of the lighting system 1, instead, only the status of the lighting device group that wins the bidding needs to be changed.

Figure 4:
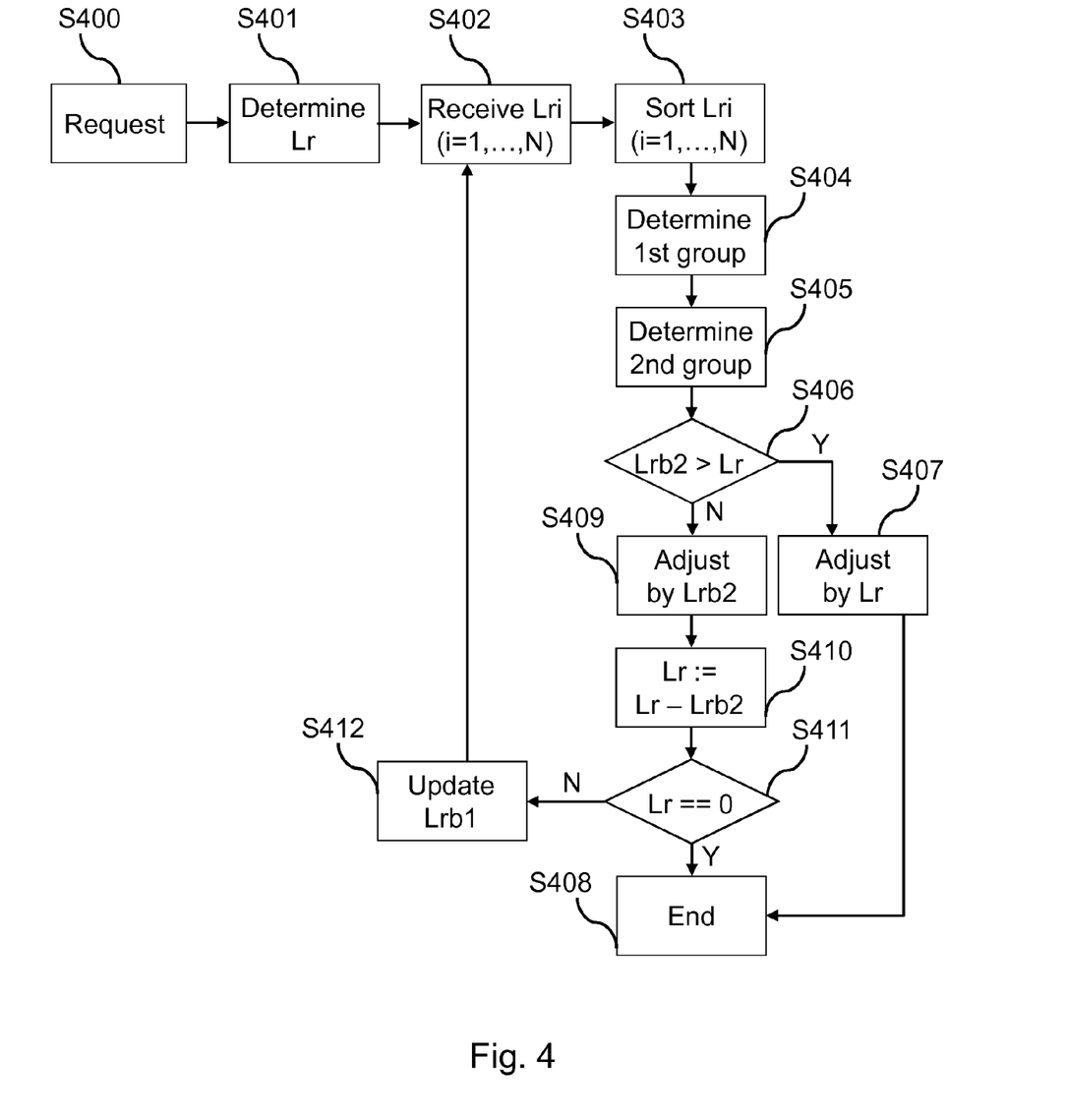
FIG. 4 illustrates steps or actions for adjusting power consumption of a plurality of lighting devices of the lighting system according to an embodiment of the present invention, wherein the power consumption is restored or increased.

The same approach can be used for power consumption/load restoration or increasing as well. FIG. 4 illustrates steps or actions for adjusting power consumption of a plurality of lighting devices 111, 121, 131 of the lighting system 1 according to an embodiment of the present invention, wherein the power consumption is restored or increased;

According to the present embodiment, the power consumption controller 10 is configured to restore or increase the power consumption or load in the lighting system 1 with regard to amount of power or load to be increased or restored, respectively, in the lighting system 1, i.e. the target power consumption increase value or target load increase value, respectively, Lr, which corresponds in general to the above used target value Ls with the difference that, in line with the present embodiment, it is used for restoration or increase purpose. In general, the target value Lr of the present embodiment corresponds to the above-mentioned target power consumption change value.

Further, with maximum power consumption, that each corresponding lighting device group can go or by which each corresponding group can be operated at most, is designated as Lmxi (i=1,2, . . . , N). Lmxi may correspond to the maximum dimming level of the lighting devices 111, 121, 131 of the group i determined, for example, by regulation or user setting. With Lri=Lmxi–Li (i=1,2, . . . , N) the load restoration or increase capability of each lighting device group is denoted. Here, it has to be noted that Lri of the present embodiment corresponds to the above-mentioned more general power consumption change value, wherein, according to the present embodiment, Lri denotes the maximum value by which the power consumption in the i-th group can be increased or restored, respectively.

According to the present embodiment, when power consumption or load restoration or increase starts, an energy management system (EMS) or an advanced meter, for example, may start the power consumption or load adjusting process. To this, the EMS or meter may transmit S400 or broadcast S400 a load or power consumption shedding request (corresponding to the above mentioned general power consumption change request) with the amount Lr or with information enabling determining the amount Lr (e.g., price of the electricity usage comparing to a target cost or load limit and/or information specifying ratio or relationship between the available/generated amount of electricity and the consumed electricity). According to the present embodiment, in step S401, the power consumption controller 10 determines the Lr. This may be performed by use of information provided with the request transmitted in step S400.

Then, according to the present embodiment, in step S402 each lighting device group can start bidding for the target amount Lr. To this, each i-th group or each i-th group controller 11, 12, 13 (i=1, . . . , N, wherein N is the number of groups) transmits Lri as the maximum value, by which the power consumption or load may be restored or increased in said group, to the power consumption controller 10.

In step S403, the power consumption controller 10, having received the Lri values for the lighting device groups, may rank or sort the Lri values in descending order such that as a first value a highest Lri value is provided and as a last value a lowest Lri value is provided.

In step S404, a first or winner group is determined by the power consumption controller 10, wherein the winner group is a lighting device group with the highest Lri, which is referred to as Lrb1 in following. In step S405, a second group is determined by the power consumption controller 10, wherein the second group is a group, which has the second highest Lri, which is referred to as Lrb2 in following. Subsequently, the power consumption controller 10 can adjust the power consumption or load by use of the Lrb1, Lrb2 and Lr.

According to the present embodiment, in step S406, the power consumption controller 10 compares the target value Lr and the power consumption change value (or bidding) of the second group Lrb2. This may be performed by use of the min function, i.e. MIN(Lrb2, Lr). Then, the power consumption controller 10 restores or increases (adjusts) power consumption or load of the first or winner group by MIN(Lrb2, Lr). To this, if the target value Lr is smaller the power consumption change value (or bidding) of the second group Lrb2, according to the present embodiment, in step S407, the power consumption controller 10 adjusts, i.e., restores or increases the power consumption of the first group by Lr. To this, the power consumption controller 10 may transmit a message, requesting power consumption or load reduction by Lr, to the first group or to the controller 11, 12, 13 of the first group. The lighting devices 111, 121, 131 of the first group will change dimming levels of its lighting devices 111, 121, 131, i.e., restore or increase the luminance such that power consumption of the lighting devices 111, 121, 131 of the first group is restored or increased by Lr. Then, in step S408 the power consumption adjusting is finished according to the present embodiment.

Otherwise, if Lr is not smaller than Lrb2, according to the present embodiment, in step S409, the power consumption controller 10 adjusts, i.e., restores or increases the power consumption of the first group by Lrb2. To this, the power consumption controller 10 may transmit a message, requesting power consumption or load reduction by Lrb2, to the first group or to the controller 11, 12, 13 of the first group. The lighting devices 111, 121, 131 of the first group will change dimming levels of its lighting devices 111, 121, 131, i.e. restore or increase the luminance such that power consumption of the first group is restored or increased by Lrb2. Thereupon, according to the present embodiment, in step S410 the target value Lr is updated by the power consumption controller 10 by setting Lr to Lr−Lrb2 or to Lr −MIN(Lrb2, Lr) respectively. Then, after updating Lr, in step S411, it is checked according to the present embodiment by the power consumption controller 10, whether further power consumption adjusting, restoring or increasing, respectively, is required. To this, it is checked whether the updated target value Lr is equal zero. If so, the power consumption adjusting is finished according to the present embodiment. If not, the power consumption change value (i.e. bidding value) Lrb1 of the first group is updated in step S412 by the power consumption controller 10 due to the adjusting the power consumption in the first group in step S409. To this, Lrb1 is set to Lrb1−Lrb2 or to Lrb1−MIN(Lrb2, Lr) respectively. Subsequently, since the power consumption adapting by the target value Lr is still not achieved, the power consumption adjusting is continued by starting the power consumption anew with the (updated) target value Lr.

According to the present embodiment, the power consumption adjusting is started anew with the step S402, thus, with anew receiving of values Lri from each i-th group.

According to an embodiment, in an implementation of the present invention, the auction-bidding process can be performed in or by the controller 10 to avoid excessive messages to be sent forth and back. The controller 10 first receives initial load restoration request amount Lr and load restoration capability Lri from each i-th group controller 11, 12, 13 (i=1,2, ..., N). Then, in or by the controller 10 iterations can be performed and load restoration amount or power consumption change value, respectively, can be calculated for each group. In the end the final load restoration amount for each group will be communicated to group controller 11, 12, 13 for execution. A pseudo-code description of the power redistribution process in controller 10 is provided below. The amount of power to be restored by a k-th group (k∈[1,N]) is equal the value of δ(k) after the execution of the pseudo-code as provided below.

```
for k:=1 to N do δ(k):=0;
while Lr > 0 do
begin determine k such that Lrk = max { Lri | 1 ≤ i ≤ N };
      determine m such that Lrm = max { Lri | 1 ≤ i ≤ N, i≠ k};
      δ:= min (Lrm, Lr);
      δ(k):= δ(k) + δ; Lr:=Lr−δ; Lrk:= Lrk − δ;
end;
```

As can be derived from the pseudo code, index k relates to the first group and Lrk relates to the load restoration capability of the first group with the index k, index m relates to the second group and Lrm relates to the load restoration capability of the second group with the index m. Thus, "determine k" specifies determining S404 the first group and "determine m" specifies determining S405 the second group. With δ(k):=δ(k)+δ, it is expressed that the power consumption of the first or k-th group is restored or increased, respectively, S407, S409 by δ(k).

Figure 5:
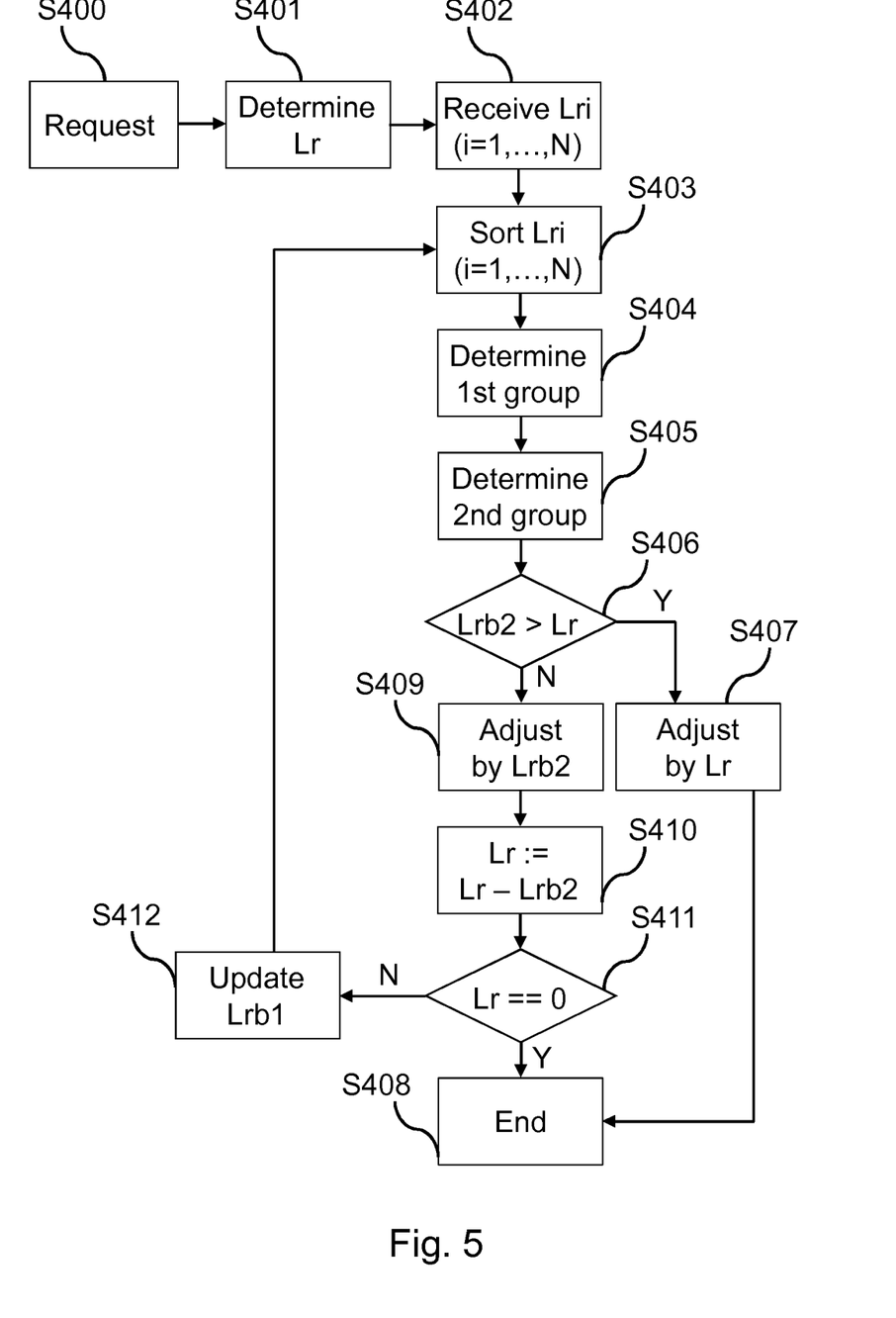
FIG. 5 illustrates steps or actions for adjusting power consumption of a plurality of lighting devices of the lighting system according to an embodiment of the present invention, wherein the power consumption is restored or increased.

FIG. 5 illustrates steps or actions for adjusting power consumption of a plurality of lighting devices 111, 121, 131 of the lighting system 1 according to an embodiment of the present invention, wherein the power consumption is restored or increased. In general, the steps of FIG. 5 correspond to steps of FIG. 4. However, according to the present embodiment, the power consumption adjusting is started anew with the step S403. I.e., in line with the present embodiment, no new bidding S402 is performed, the adjusting is performed on the present values Lri. Here, it has to be noted that, if no ranking or sorting S403 of values Lri is performed, the anew adjusting power consumption may be started also with step S404, i.e. with determining of the first group having the highest Lri. Here, the present invention allows also an implementation where several starting points (like S402, S403, S404) for anew executing the adjusting power consumption may be combined, wherein a corresponding appropriate starting point may be chosen by use of additional factors like the probability for change of values Lri, for example.

Further, it has to be pointed out that a power consumption controller 10 may be configured to perform both the power consumption reduction (as described exemplary with regard to FIGS. 2 and 3) and the power consumption increasing (as described exemplary with regard to FIGS. 4 and 5). Therefore, the present invention is directed in general to power consumption adjusting comprising the power consumption reduction and/or power consumption increasing.

It is obvious that the method described above can be used in various levels of the lighting system 1. A group controller 11, 12, 13 can adjust the power consumption of the devices 111, 121, 131 in the corresponding group across each luminaries towards the targeted power consumption change received from controller 10.

Figure 6:
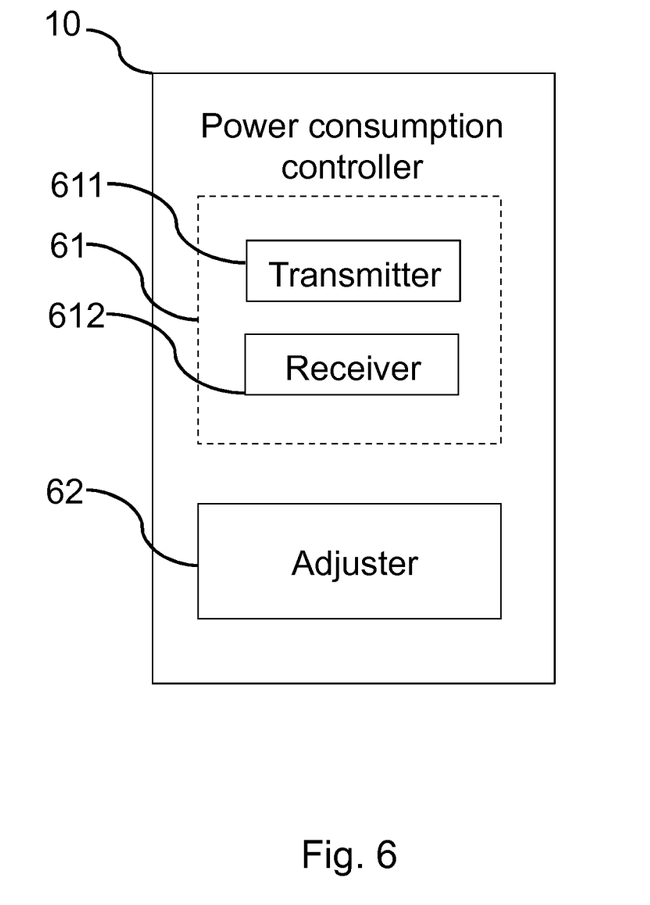
FIG. 6 illustrates arrangement of a power consumption controller according to an embodiment of the present invention.

FIG. 6 illustrates arrangement of a power consumption controller 10 according to an embodiment of the present invention. Here, the power consumption controller 10 comprises a transmitter 611 for performing transmitting data, information, signals to further devices like the utility, EMS, meters, group controllers 11, 12, 13 etc. Further, the power consumption controller 10 comprises a receiver 612 for receiving data, information, signals from further devices like the utility, EMS, meters, group controllers 11, 12, 13 etc. The transmitter 611 and the receiver 612 may be comprised in or combined to one component like a transceiver, for example, indicated by element 61 in FIG. 6. Moreover, the power consumption controller 10 comprises an adjuster 62, which is configured to perform at least one of the above-described steps S201, S203 to S212, S401, S403 to S412. The adjuster 62 may be, for example, a processor or a component of a processor, or a further suitable hardware and/or software component of the power consumption controller 10.

It is obvious that the above-described embodiments can be combined in various ways. By means of the above described power consumption adjusting, the adjusting of dimming levels of lighting devices is provided such that function and/or characteristics of the lighting devices are taken into consideration. Further, an optimal adjusting the load/power control/dimming levels in the entire lighting system is enabled, wherein it is ensured, that the end user comfort is not sacrificed or affected by adjusting the load/power control/dimming levels in the entire lighting system. Furthermore, the present invention ensures a flexible, efficient and fast adjusting of electricity consumption or power consumption, respectively. Moreover, the load or power consumption, respectively, is shed or restored in a lighting system with capability of balance between cost and end user comfort. Furthermore, during the load or power consumption shedding or restoring, the load or power consumption shedding or restoring capability is taken into account for each group of lighting devices or load. Additionally, a new request for power consumption or load shedding or restoration may be handled after performing the power consumption or load adjusting by use of the auction mechanism without changing status of all lighting devices and/or loads in the lighting system. Further, a simple implementing of the adjusting according to the present invention is enabled, since the same adjusting mechanism is applied to both the shedding and the restoration of power consumption or loads in the lighting system.

The invention claimed is:

1. A device configured for adjusting power consumption of a plurality of lighting devices of a lighting system said plurality of lighting devices being divided into a plurality of groups and each group comprising at least one lighting device of the plurality of lighting devices and having a corresponding power consumption change value, wherein the corresponding power consumption change value indicates a maximum value, by which the power consumption may be changed in said group, wherein the device is adapted to:
   determine a first group, which has a power consumption change value, which is a largest power consumption change value among the power consumption change values of the plurality of groups;
   determine a second group, which has a power consumption change value being a second largest power consumption change value among the power consumption change values of the plurality of groups; and
   adjust power consumption of the first group by use of the power consumption change value of the second group with regard to a target power consumption change value of the lighting system by which the power consumption is intended to be changed in the lighting system.

2. The device according to claim wherein the device is configured to adjust power consumption of the first group by the target power consumption change value of the lighting system if the power consumption change value of the second group is larger than the target power consumption change value of the lighting system and to adjust power consumption of the first group by the power consumption change value of the second group if the power consumption change value of the second group is smaller than or equal the target power consumption change value of the lighting system.

3. The device according to claim 2, wherein the device is configured to adjust power consumption of the first group by transmitting the target power consumption change value of the lighting system to the first group if the power consumption change value of the second group is larger than the target power consumption change value of the lighting system and to adjust power consumption of the first group by transmitting the power consumption change value of the second group to the first group if the power consumption change value of the second group is smaller or equal the target power consumption change value of the lighting system.

4. The device according to claim 3, wherein, if the target power consumption change value of the lighting system indicates that the power consumption is intended to be reduced in the lighting system, the device is configured to reduce power consumption when adjusting power consumption and each power consumption change value of the power consumption values of the plurality of groups indicates a maximum value, by which the power consumption may be reduced in the corresponding group of the plurality of groups, and wherein, if the target power consumption change value of the lighting system indicates that the power consumption is intended to be increased in the lighting system the device is configured to increase power consumption when adjusting power consumption and each power consumption change value of the power consumption values of the plurality of groups indicates a maximum value, by which the power consumption may be increased in the corresponding group of the plurality of groups.

5. The device according to claim 4, wherein the device is adapted to transmit a power consumption change request to each group of the plurality of groups, wherein said request comprises the target power consumption change value of the lighting system.

6. The device according to claim 5, wherein the device is adapted to receive for each group of the plurality of groups the corresponding power consumption change value of the group.

7. The device according to claim 6, wherein the device is adapted to receive the power consumption change values of the plurality of groups in response to the power consumption change request.

8. The device according to claim 7, wherein the device is adapted to execute sorting of the power consumption change values of the plurality of groups, wherein a larger power consumption change value is sorted before a smaller power consumption change value.

9. The device according to claim 8, wherein, if the power consumption change value of the second group is smaller than the target power consumption change value of the lighting system the device is configured to:
   reset the target power consumption change value of the lighting system by subtracting the power consumption change value of the second group from the target power consumption change value of the lighting system;
   reset the power consumption change value of the first group by subtracting the power consumption change value of the second group from the power consumption value of the first group; and
   execute anew the adjusting power consumption of a plurality of lighting devices of a lighting system.

10. The device according to claim 9, wherein the device is configured to adjust power consumption of the plurality of lighting devices of the lighting system after receiving the target power consumption change value of the lighting system by the device.

11. A method for adjusting power consumption of a plurality of lighting devices of a lighting system, said plurality of lighting devices being divided into a plurality of groups and each group comprising at least one lighting device of the plurality of lighting devices and having a corresponding power consumption change value, wherein the corresponding power consumption change value indicates a maximum value, by which the power consumption may be changed in said group, wherein the method comprises:
   determining a first group, which has a power comsumption change value, which is a largest power consumption change value among the power consumption change values of the plurality of groups;
   determining a second group, which has a power consumption change value being a second largest power consumption change value among the power consumption change values of the plurality of groups; and adjusting power consumption of the first group by use of the power consumption change value of the second group with regard to a target power consumption change value of the lighting system, by which the power consumption is intended to be changed in the lighting system.

12. The method according to claim 11, wherein the method is performed by a device, configured for adjusting the power consumption of the plurality of lighting devices of the lighting system.

13. A system comprising a device according to claim 10.

* * * * *